United States Patent

Vinogradov et al.

[15] 3,689,209
[45] Sept. 5, 1972

[54] APPARATUS FOR MANUFACTURING ROLLED PRODUCTS FROM POWDERY MATERIALS

[72] Inventors: Gleb Andreevich Vinogradov, Brest-Litovsky Prospekt, 10, kv. 303; Oleg Alexandrovich Katrus, ulitsa Kapitanovskaya, 2, kv. 17; Anatoly Ilich Otrok, ulitsa Novo-Okrughnaya, 3a, kv. 59, all of Kiev, U.S.S.R.

[22] Filed: July 27, 1970

[21] Appl. No.: 58,615

[52] U.S. Cl. ............................................. 425/79
[51] Int. Cl. ............................................. B22f 3/18
[58] Field of Search......18/9, 2 C, 10; 72/199; 25/21; 425/79

[56] References Cited

UNITED STATES PATENTS

| 480,609 | 8/1892 | Nevegold.....................72/199 |
| 2,904,829 | 9/1959 | Heck..............................18/9 |
| 3,277,527 | 10/1966 | Essers et al.....................18/9 |

Primary Examiner—J. Spencer Overholser
Assistant Examiner—David S. Safran
Attorney—Waters, Roditi, Schwartz & Nissen

[57] ABSTRACT

Opposed rolls for manufacturing rolled products from powdery material are provided with lateral collars which shape the edges of the product being rolled and form a receptacle for the powdery material in which lateral forces are developed and applied to the product in the course of rolling. The space between the collars has a height between 0.1 and 0.9 times the average spacing between the rolls (average thickness of the product) and a width between 0.2 and 3 times the average spacing between the rolls.

4 Claims, 10 Drawing Figures

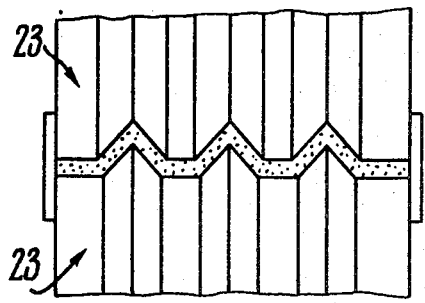
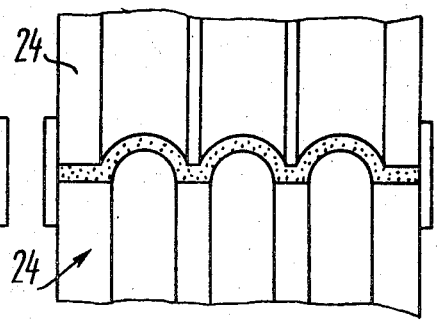
FIG. 8    FIG. 9
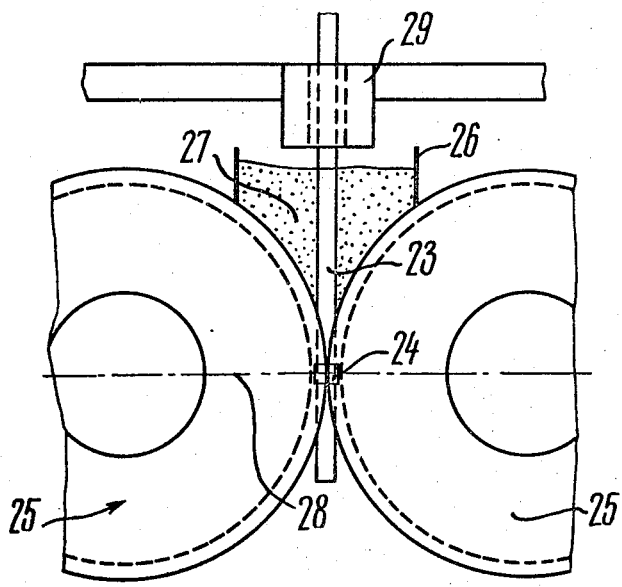
FIG. 10

APPARATUS FOR MANUFACTURING ROLLED PRODUCTS FROM POWDERY MATERIALS

This invention relates to the manufacture of products from powdery materials and more specifically, to shaped rolls used for this purpose.

Known in the present state of the art is a method of manufacturing rolled products from powdery materials, according to which powder is fed to the rolls.

Rolls utilized for carrying said method into effect are cylindrically shaped and have planar working surface which fails to provide rolled stock adequately compact throughout its width, results in higher wastes and involves additional operations for cropping undercompacted edges of rolled products. For the same reasons it becomes difficult to manufacture profiled or shaped rolled stock on shaped rolls employed in rolling cast or forged poreless products.

It is an object of the present invention to provide shaped rolls for manufacturing rolled products from powdery materials to ensure the manufacture of a rolled stock equally compact across its full width and to cut down waste, as well as allow dispensing with additional operations of cropping undercompacted edges of the rolled products.

It is another object of the present invention to provide such shaped rolls which make it possible to roll shaped or profiled products.

In the manufacture of rolled products from powdery materials, the powdered material is fed to the rolls, and according to the invention, the powder is fed across a width greater than that of the product to be manufactured so that an excess powdered material develops lateral forces applied to the edges of the product being rolled.

In the shaped rolls according to the present invention, the height of the roll collars which shape the edges of the products being rolled, is within 0.1 to 0.9 and the width thereof is within 0.2 to 3 of an average rolled stock thickness so that said roll collars form a receptacle filled with the powdered material which develops a lateral force applied to the product in the course of rolling.

By varying the relation between the height and width of the roll collar one can provide different lateral forces effective on various sections of the shaped rolled stock, thereby attaining a uniform compacting of the powder.

It is preferable to employ shaped rolls having collars which shape the edge of the products being rolled featuring a height within 0.5 to 0.8 and a width within 1 to 2 times an average stock thickness. With the above ratios between the height and width of the roll collars, a more adequate and uniform compacting of the powder being rolled is attainable.

The present invention allows of manufacturing rolled stock equally compact across the entire width thereof, makes it possible to cut down production waste and to produce a variety of new kinds of shaped rolled stock from powders (solid-drawn porous pipes, sleeves, bushes filters, sandwich-type bimetal stock, etc.).

In what follows the invention is explained by way of exemplary embodiments thereof to be taken in conjunction with the accompanying drawings, wherein:

FIG. 8 is a plan view of shaped rolls for manufacturing multisection rectangular shaped stock from powdered materials, according to the invention;

FIG. 9 is a plan view of shaped rolls for manufacturing multisection semi-round shaped stock, according to the invention; and FIG. 10 illustrates a manufacturing diagram of a solid-drawn seamless pipe from powdered materials as shown in side elevation.

Figure 1:
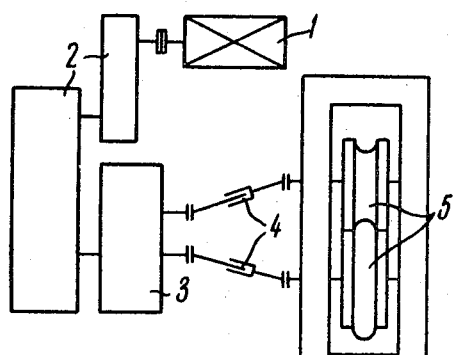
FIG. 1 is a schematic diagram of a rolling mill for manufacturing rolled products from powdery materials, according to the invention.

Now referring to the drawings, FIG. 1 is a schematic diagram of a rolling mill for manufacturing rolled products from powdery materials, comprising an electric motor 1 which transmits torque through reduction gear units 2 to a pinion stand 3 which distributes and converts imparted torque into two opposite torques which are imparted through spindles 4 to rolls 5.

The rolls 5 are arranged either horizontally or at a small angle (up to 30°) to the horizontal. Accordingly, the rolling of powders is effected either vertically or at an angle. Powders are fed from a hopper (not shown in the drawing) to the rolls 5 by their own weight across the feed width A (FIG. 2) which is in excess of the actual width B of a product 6 being rolled.

Figure 2:
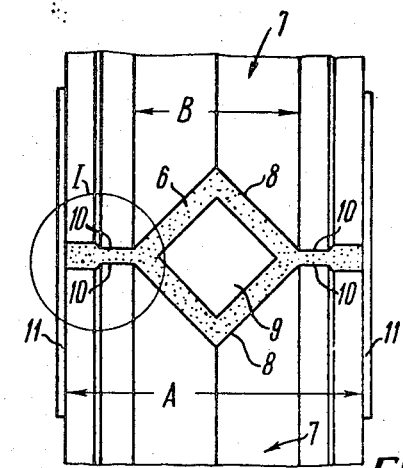
FIG. 2 is a plan view of shaped rolls for manufacturing rolled products from powdery materials, featuring a rectangular-shaped roll mandrel, according to the invention.

FIG. 2 illustrates an embodiment of rolls 7 for rolling solid-drawn (seamless) pipes 6 rectangular in shape. The shape and size of external grooves 8 of the roll passes correspond to the outside dimensions of the pipe 6, whereas the shape and size of a roll mandrel 9 correspond to the pipe bore diameter and shape. The roll grooves 8 are restricted by roll collars 10. Spilling of the powder from the hopper is prevented by fixed cheeks 11 of the latter.

Figure 3:
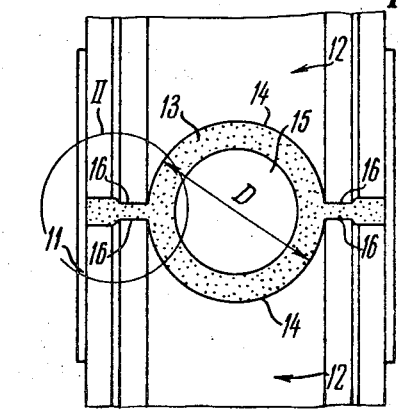
FIG. 3 illustrates rolls featuring a round-shaped roll mandrel.

FIG. 3 illustrates another embodiment of rolls 12 for rolling a round-shaped solid-drawn (seamless) pipe 13. The shape and size of grooves 14 of the roll passes correspond to the outside dimensions of the pipe 13, whereas the shape and size of a roll mandrel 15 correspond to the pipe bore diameter and shape. The roll grooves 14 are restricted by roll collars 16.

Figure 4:
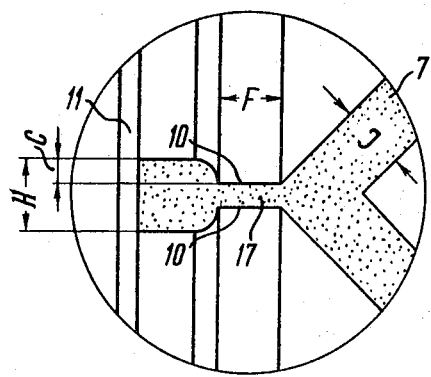
FIG. 4 illustrates a unit I of FIG. 2.
Figure 5:
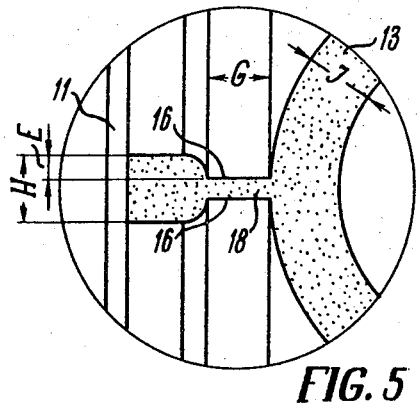
FIG. 5 illustrates a unit II of FIG. 3.

Lateral forces applied to the edges of the products 6 and 13 being rolled are established by the roll collars 10 and 16 (FIGS. 2, 3, 4 and 5) the heights C and E (FIGS. 4, 5) of which are within 0.1 to 0.9 and the widths F and G, within 0.2 to 3 of the average thickness value J of the rolled stock being produced. Receptacles 17 and 18 are formed between the collars 10 and 16 of the rolls 7 and 12 that are filled with powdery material which develops a lateral force applied to the products 6 and 13 in the course of rolling.

Figure 6:
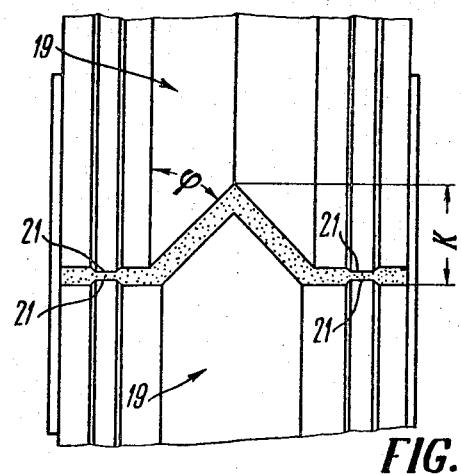
FIG. 6 is a plan view of shaped rolls for manufacturing rectangular-shaped rolled stock from powdered materials, according to the invention.
Figure 7:
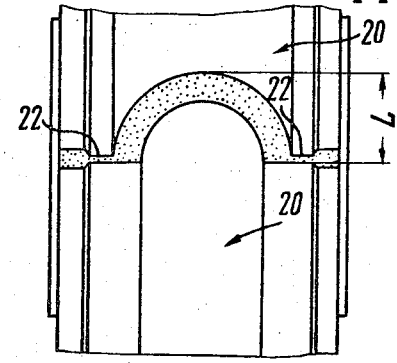
FIG. 7 illustrates rolls for manufacturing semi-round shaped rolled stock.

FIGS. 6 and 7 illustrate embodiments of shaped rolls 19 and 20 for manufacturing a single-section rectangular and round shaped stock from powdery material.

Roll collars 21 and 22 perform similar functions as the collars 10 and 16 in FIGS. 2, 3, 4 and 5, the rolls 19 and 20 featuring such a roll pass design that the taper of the grooves ($<\phi$) is at least 15°, this being due to the fact that at smaller taper angles rolling of powdery materials is impracticable.

FIGS. 8 and 9 illustrate embodiments of shaped rolls 23 and 24 for manufacturing multisection rectangular and semiround shaped stock represented in FIGS. 6 and 7.

Multisection roll pass design is likewise applicable for making solid-drawn stock from powdery materials. For this purpose, use is made of rectangular, round, oval, diamond and other roll pass designs.

As in the case of rolling on plain cylindrical rolls the average thickness value J of the shaped stock (i.e., an average roll pass height) is equal to approximately one hundredth of the entire roll diameter.

At the same time the total heights K and L (FIGS. 6, 7) of the roll passes or the diameter D (FIG. 3) of the roll passes in rolling seamless pipe 13 considerably exceed one percent of the roll diameter which makes it possible to extend the range of pipes being rolled.

The rolls for rolling shaped products are so grooved that the groove center line coincides with the roll center line. This precludes collaring of the rolls by the stock being rolled and prevents destruction of the latter.

The length of solid-drawn pipes depends upon the length of the roll mandrels 9 and 15. To prevent the mandrels from being stuck to the pipes 6 and 13 the mandrels are ground and hardened to a high hardness number, whereas before rolling they are lubricated with oil or glycerol.

Rolling of equally compact shaped products is effected as follows.

When rolling single-section or multisection shaped stock, powdery material is continuously fed from the hopper downwards to the rotating rolls so that the width of its feed is in excess of that of the product being rolled; the finished shaped stock comes off the rolls downwards.

When rolling solid-drawn pipes, for the purpose of obtaining an equally compact pipe throughout its cross section, a roll mandrel 23 (FIG. 10) is provided with an elastic (rubber) ring 24 with a thickness approximately the same as the thickness J of the pipe being rolled. The roll mandrel 23 with the elastic ring 24 slipped thereover is fed to rotating rolls 25, whereupon the rolls are stopped and powdery material is fed from a hopper 26 into a space 27 formed between the rolls and the mandrel across the width exceeding the outer diameter of the pipe being rolled. To provide that the mandrel 23 be perpendicular to the center line 28 of the rolls 25, the mandrel 23 is guided to the rolls through a centering ring 29. The mandrel having been centered the rolling of pipes from powdery material is effected. The rolling rate is equal to 1–20 m/min with the powder being fed by its own weight. Once the finished pipe comes off the rolls the mandrel is extracted therefrom.

What is claimed is:

1. Apparatus for manufacturing rolled products from powdery materials, comprising: opposed shaped rolls including collars which shape the edges of the product being rolled, said rolls having spaced opposed surfaces which define the thickness of the rolled product, said collars defining a space therebetween having a height lying within 0.1 to 0.9 and a width lying within 0.2 to 3 of the spacing between said opposed surfaces of the rolls to form a receptacle for the powdery material, said collars constituting a means for developing lateral forces applied to said product in the course of rolling.

2. Apparatus as claimed in claim 1, wherein the height of said roll collars lies within 0.5 to 0.8 of the spacing between the opposed surfaces of the rolls, and the width within 1 to 2 of the spacing between the opposed surfaces of the rolls.

3. Apparatus as claimed in claim 1 comprising a mandrel interposed between the rolls for forming hollow products.

4. Apparatus as claimed in claim 1 comprising fixed cheeks on said rolls laterally bounding the space between the collars.

* * * * *